Aug. 8, 1939.  W. A. RINGLER  2,168,583
METHOD OF WRAPPING PACKAGES
Original Filed Sept. 19, 1934  2 Sheets-Sheet 1
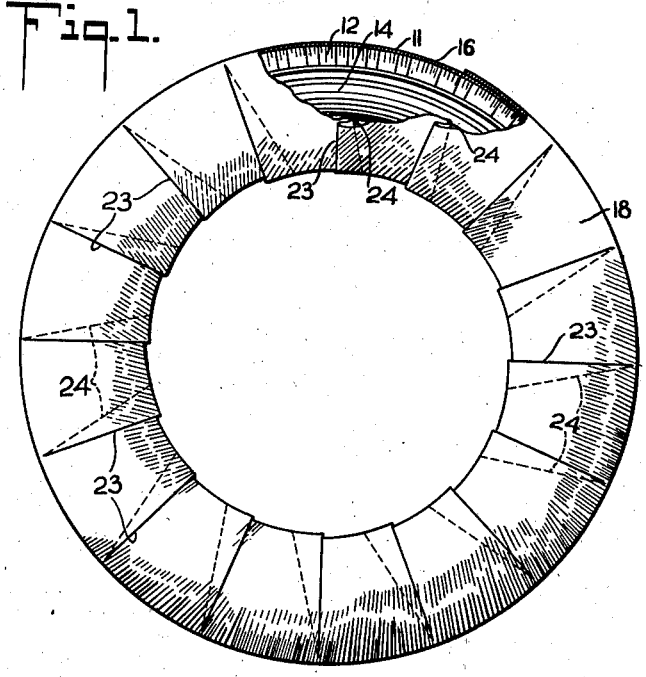
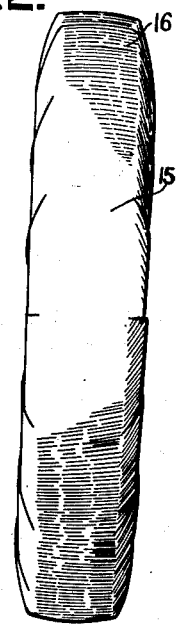
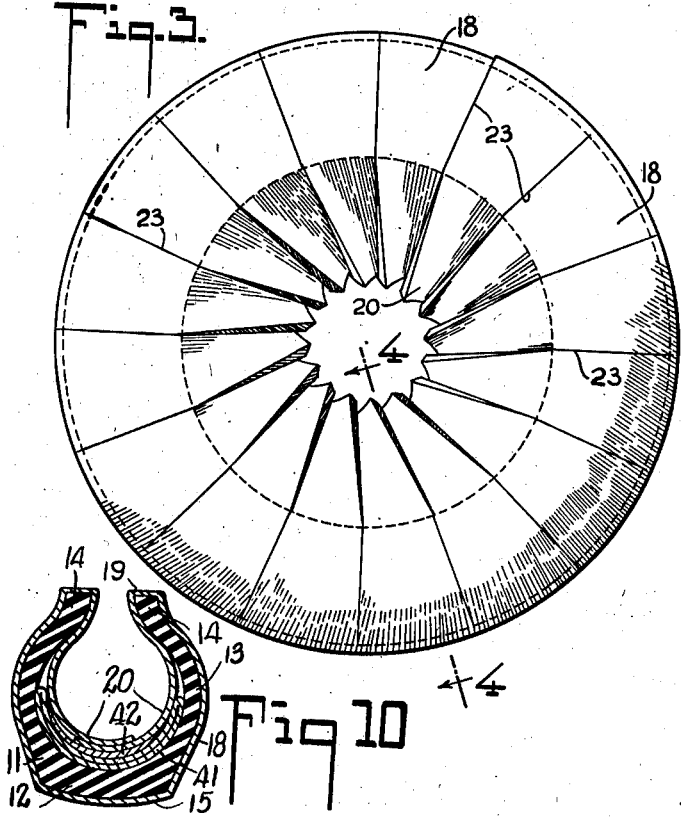
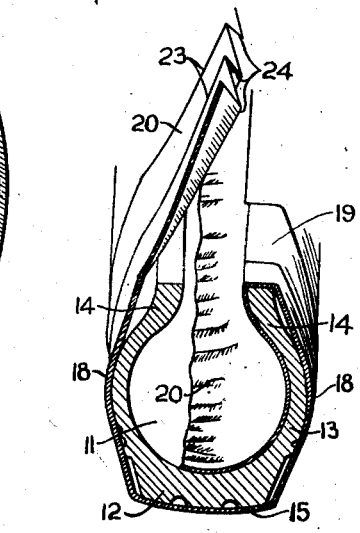
INVENTOR
William A. Ringler
BY Henry J. Lueke
HIS ATTORNEY Aug. 8, 1939.    W. A. RINGLER    2,168,583
METHOD OF WRAPPING PACKAGES
Original Filed Sept. 19, 1934    2 Sheets-Sheet 2
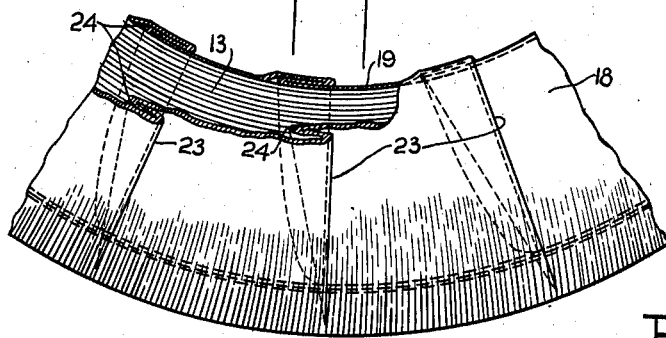
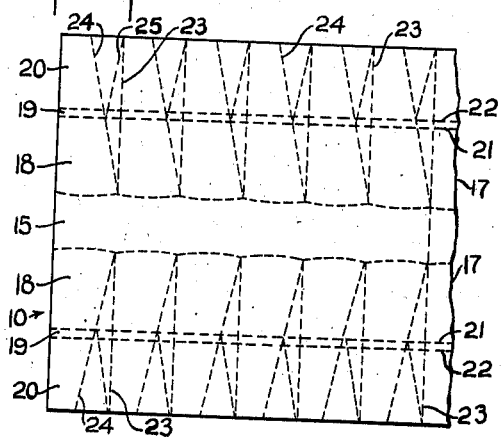
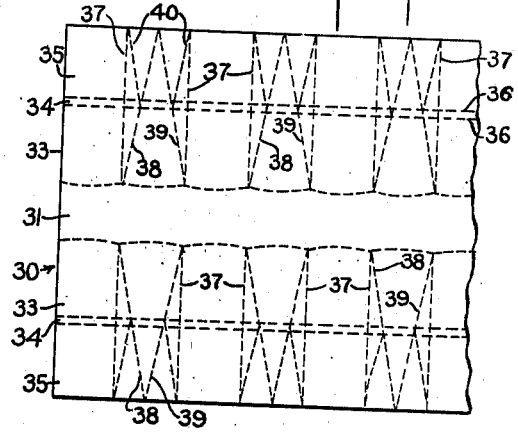
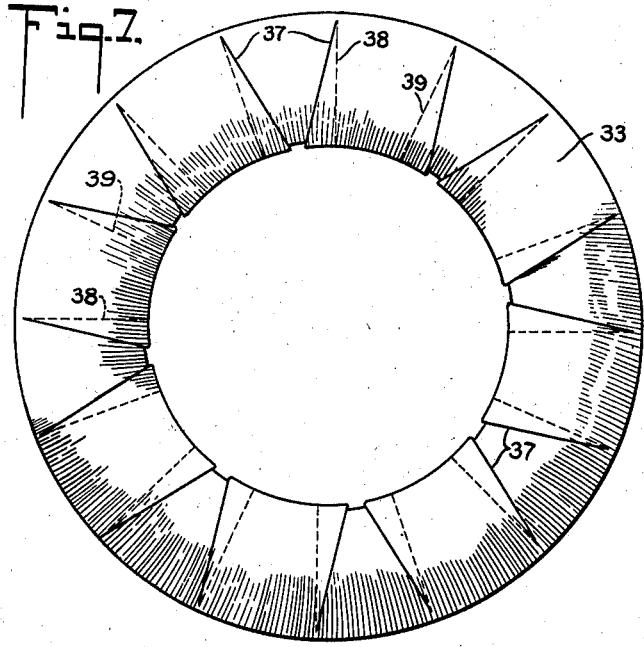
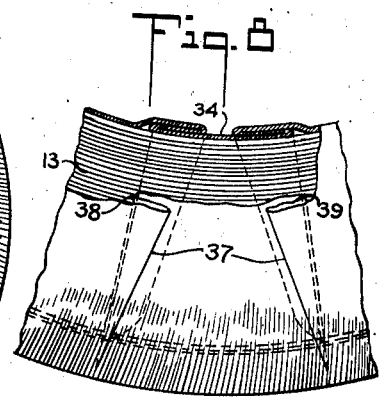
INVENTOR
William A. Ringler
BY
Henry J. Lucke
HIS ATTORNEY Patented Aug. 8, 1939

2,168,583

UNITED STATES PATENT OFFICE 2,168,583

METHOD OF WRAPPING PACKAGES

William A. Ringler, Wayne, Pa., assignor, by mesne assignments, to United States Rubber Company, New York, N. Y., a corporation of New Jersey Original application September 19, 1934, Serial No. 744,643. Divided and this application February 24, 1938, Serial No. 192,260

9 Claims. (Cl. 93—2)

My invention relates to packages, and more particularly to the improved method of applying a covering of wrapping material to packages.

My invention is particularly applicable to articles made of distortable material having an inner and outer diameter, the outer diameter being the greater, as in articles having a toroidal form, particularly tire shoes or casings.

The present application is a division of my co-pending application Serial No. 744,643, filed September 19, 1934, and which matured into Patent No. 2,109,504 on March 1, 1938.

Prior to the shipment of tire casings from the factory, the same are enveloped in a covering of wrapping material. This is done for a plurality of reasons, such as the protection of the tire casing from injury, the maintaining of the tire casing in new or "fresh" condition, and the labelling of the different sizes and grades of tire casings in order that they may be readily identified. Because of the toroidal shape and distortable qualities of a tire casing, and because of the considerable total displacement thereof, it has been found difficult to satisfactorily and cheaply envelope the same in a wrapping material possessed of the requisite rigidly and wear resisting qualities, and in a form that will successfully resist the severe shocks to which the same as subjected before reaching the ultimate consumer.

It has heretofore been proposed to use as an enveloping material a soft paper, such as crepe paper, but the very nature of this paper renders it susceptible to deformation and injury, and in the main, has been found unsatisfactory. The form of the wrapper has been varied from time to time, until at present the accepted form is the so-calld "wrap around" where a relatively narrow strip of paper is helically wound around the substantially circular cross section of the tire casing. A "wrap around" envelope of crepe paper is subject to all the objections pointed out above, and has been found to be unsatisfactory. A "wrap around" envelope of a sufficiently durable material, such as a manila paper, avoids the objections to the distortion above pointed out, but the resulting package is subject to a serious fault. Further, the necessary and continuous overlap of the strip of paper employed as a wrapping uses more material than is necessary, adding to the weight and cost of the resulting package without commensurate advantages. Because of the character of the enveloping material, it is inelastic and inextensible, and consequently, when subjected to shock, as by dropping the tire casing from a height, or suddenly deforming the tire casing, the enveloping material splits and is destroyed. In spite of these defects the "wrap around" envelope of manila or like papers appears to have become standard in the tire trade.

In carrying out my invention, I utilize a strip or band of a strong, relatively smooth, flexible material, such as manila paper, or a composite paper comprised of a layer of paper on one face of which is spread a layer of water-proofing material, such as asphaltum, the exposed face of the asphaltum being covered with an open net-like material, the strip extending about the outer periphery of the tire casing and lying smoothly in engagement therewith without distortion. The strip of enveloping material is wide enough to fold over and protect the side walls of the tire casing and to infold into the interior thereof sufficiently to protect said interior and any article that may be placed therein, as a tube and/or a tube protecting strip. To conform the lateral portions of the encircling and enveloping strip of paper to the contour of the side walls of the tire casing and to infold or tuck the edges of such lateral portions to a position within the tire casing, I fold or pleat the material thereof on radial or substantially radial lines, with respect to the tire casing and transverse to the length of the strip. Such folding or pleating not only simulates, on the side walls of the tire casing, the appearance of present day tire enclosing envelopes, but actually stiffens or reinforces the envelope in its entirety, as well as causing the paper to conform closely to the rounded contour of the tire casing from the tread to the bead portion thereof.

The folding or pleating, while the same may be performed manually, is preferably done automatically by machinery. Such machinery preferably cuts off a strip of appropriate length from a roll of paper, applies the same to a tire casing, and folds and/or pleats the paper simultaneously with the application of the strip to the tire casing.

The absence of the enveloping material across the inner diameter of the tire casing, or from one bead portion to the other, removes the possibility of a breaking strain being placed on the enveloping material, and thus removes the most frequent cause of rupture of such material. I am aware that it has been proposed to infold crepe paper enveloping material to a point within the tire casing, but the nature of such paper precludes its remaining in set position. But in no instance of which I am aware has it been found practical to utilize a stiff manila kraft, composite board or similar paper in this situation.

An object of my invention therefore, is an improved method of applying covering material to packages.

Another object is an improved method of applying relatively stiff sheet material to a tire casing to partially enclose the tire casing therein.

Another object is an improved method of applying relatively stiff sheet material in the form of a band to a tire casing and wherein the edges of the band are housed within the interior of the tire casing.

A further object is an improved method of applying an enclosing envelope to tire casings.

In the accompanying drawings:

Fig. 1 is a front elevation, partly in section, of a wrapping in position on a tire casing, and applied to the casing according to my improved method.

Fig. 2 is a side elevation of Fig. 1;

Fig. 3 is a side elevation, similar to Fig. 1, but with one of the lateral edges of the wrapper not yet "tucked" into the interior of the tire casing;

Fig. 4 is a section on the line 4—4 of Fig. 3;

Fig. 5 is an elevation of a fragment of a wrapper, parts being broken away to clearly illustrate the method of folding the lateral portions to conform to the rounded contour of the side wall of a tire casing;

Fig. 6 is a plan view of a portion of a strip of material from which a wrapper is made, and illustrating the method of folding the lateral portions thereof;

Fig. 7 is a view, similar to Fig. 1, and showing a modification of my improved method of wrapping;

Fig. 8 is a view, similar to Fig. 5, of the modification shown in Fig. 7;

Fig. 9 is a view, similar to Fig. 6, and applicable to the method of wrapping as illustrated in Fig. 7, and Fig. 10 is a sectional view of a tire casing wrapped according to my improved method, and showing a tube and protecting strip enclosed within the casing.

Referring to the drawings, 10 designates a strip of wrapping material, of smooth, flexible and substantially inextensible sheet material, such as manila paper, kraft paper, composite board, or other like suitable material, of any suitable width and preferably of indeterminate length. When of indeterminate length the strip may be conveniently furnished in rolls, large or small, as desired, and cut off in lengths equal to the circumference of the tire casing to be wrapped, or enough longer to provide for a sufficient overlap. If preferred the strips may have their ends joined prior to the folding and pleating operation. The form in which the strip of wrapping material is furnished therefore, is immaterial as far as concerns the novelty of my invention, and in the subsequent description of my invention it will be assumed that the strip 10 of wrapping material is of indeterminate length.

The reference numeral 11 designates in its entirety a distortable article of toroidal shape, such as a tire casing of the usual straight sided type having a tread portion 12, the sides 13, and the beads 14, the tread 12 defining the outer circumference of an annulus, and the beads 14 the inner circumference.

The strip 10 of wrapping material is wrapped around the circumference of the tire casing 11, the medial longitudinal portion 15 of the strip engaging with the tread 12 and lying smoothly thereon. The ends of the strip 10 overlap, as at 16, and the overlapping ends are secured together, preferably by suitable adhesive. The lateral portions 17 of the strip 10 are divided into three zones 18, 19 and 20, the zone 19 being defined by the parallelly arranged dash lines 21, 22. The lateral portions 17 are provided with parallelly spaced dash lines 23 perpendicular to the length of the strip 10. Also the lateral portions 17 are provided with parallelly spaced dash lines 24 extending at an angle to the length of the strip 10. The dash lines 23 and 24 are arranged in pairs, as shown in Fig. 6, and the lines of each pair meet at the edge of the medial longitudinal portion 15 of the strip 10. The dash lines 23 and 24 form lines of fold for the lateral portions 17 of the strip 10, the dash line 23 designating an outside fold, and the dash line 24 designating an inside fold, as will be obvious from an inspection of Figs. 1, 3 and 5.

The strip 10 has been described as having the dash line 21, 22, 23, 24, etc. on its surface, but such need not be, and preferably is not, actually the case. The various lines designate lines of folding or pleating, and the actual folding or pleating make lines or creases in the body of the strip 10. In the completed enveloping wrapper, when a tire casing is actually enveloped therein, such lines or creases are quite apparent.

In addition to the dash lines above referred to, there is shown, in Fig. 6, other dash lines 25 running from an end of the dash lines 23 to a point intermediate the ends of the dash lines 24. This designates the line of fold or crease taken by the material of the outer edge of the zone 20 when such zone is inserted within the tire casing 11 between the beads 14.

As stated above, the folding of the lateral portions 17 takes place simultaneously with the placing of the strip 10 on the tire casing 11, so that the folding on the lines 23 and 24 progresses simultaneously with the placing of the strip 10, and is completed when the overlap 16 is reached.

The enclosing envelope now has the appearance shown in Fig. 3. The next step is the folding inwardly of the shaded portion in the centre of Fig. 3, or the beginning of the formation of the zone 19. The zone 19 is now in engagement with the top of the bead 14, whereupon the zone 20 is folded to a position within the tire casing 11, this operation being facilitated by the presence of the lines of fold 25. When within the tire casing 11 the edge portion of the zone 20 of the strip 10 expands to practically its original size and thus acts as a means for locking the strip 10 in enveloping position on the tire casing 11, holding the same firmly in position.

The folding, creasing and infolding of the strip 10 may be done manually or by mechanical means. It is contemplated that such operations will be performed by machinery, but the method is not limited to such machinery.

The method of folding and pleating to obtain an enveloping wrapper according to my invention may be varied to suit different tastes or requirements. One method of folding and pleating is described above in connection with the appropriate figures of the drawings. In Figs. 7, 8, and 9, I have illustrated another method of practising my invention. Referring to such Figs. 7, 8 and 9, wherein Fig. 7 shows a strip 30 completely enveloping a tire casing, Fig. 8 a portion of a strip 30, partly in section, and in position on a tire casing, and Fig. 9 a developed view of a portion of a strip 30 of wrapping material, it will be noted that the appearance of the strip 30 in tire casing enclosing condition is distinctly different from the similar condition of the strip 10 in Fig. 1 for example.

The strip 30 of wrapping material is provided with a medial longitudinal zone 31 and lateral portions 32, as in the strip 10. The lateral portions 32 are divided into three zones 33, 34 and 35. The zones 34 are defined by parallelly arranged dash lines 36. The lateral portions 32 are also provided with parallelly spaced dash lines 37 perpendicular to the length of the strip 30, and with pairs of dash lines 38 and 39 extending from the inner ends of pairs of dash lines 37 to a point at the outer edge of the strip 30 midway of the outer ends of such dash lines 37. The dash lines 38 and 39 are arranged at an angle to the length of the strip 30. Further, the dash lines 38 are parallel to each other, and the dash lines 39 are parallel to each other. In addition to the above, the strip 30 is provided with dash lines 40 extending from a point intermediate the ends of the dash lines 38 and 39 to the outer ends of such lines.

As in the showing in Fig. 6, the dash lines in Fig. 9 may be actually impressed on or in the strip 30. Preferably however, no lines of any character are on the strip 30, such lines as have been described being made in the strip preferably during the operation of folding, pleating or creasing the material to conform the same to a tire casing. Such lines as have been described therefore designate the lines of folding or pleating. The dash lines 37 designate outside folds or pleats; the lines 38 and 39 inside folds or pleats; and the lines 40 expansion folds or pleats.

Preferably, as the strip 30 is being applied to the tread 12 of the tire casing 11, the outside folds or pleats 37 and the inside folds or pleats 38 and 39 are formed to thereby conform the lateral portions 32 to the side walls 13 of the tire casing 11. Subsequently the zone 34 is brought into engagement with the face of the bead 14 of the tire casing 11, after which the zone 35 is infolded to a position within the tire casing 11.

The result is as shown in Fig. 7, where the space between pairs of dash lines 38 extend radially, or substantially radially, of the tire casing 11. The inherent stiffness of the material of which the strip 30 is composed, combined with the fact that the zone 35 expands on the dash lines 40 when the zone 35 is infolded or tucked within the tire casing 11, holds the enveloping wrapper in position against accidental displacement or removal.

In Fig. 10 I have shown in section a tire casing 11 in the interior of which is placed a tube 41 and a tube protecting strip 42, such elements being retained in position and protected against damage by the infolded or tucked portions 20 of the wrapping material.

The wrapper employed may be made initially of a closed band of suitable perimeter and width, and with the folds or pleats physically formed in the material thereof. Both the perimeter and width of the closed band will naturally vary in accordance with the outer diameter and size of the toroidal article to be wrapped, and such band may or may not have the folds or pleats physically formed in the material thereof prior to the application of the band to a tire casing.

The method of feeding the strip of material relative to and applying the same to the tire casing, or other toroidal object may be carried out as preferred. For example, the strip material may be fed from a roll to the tire casing or other toroidal object and passed about the same, or the tire casing or other toroidal object may be rotated relative to the strip material. The manner of folding, i. e. weakening the areas of the strip material may be carried out by forming the folds at the predetermined areas of the strip material in advance of the application of the strip material to and about the tire casing or other toroidal object or the strip material may be brought into position relative to the tire casing or other toroidal object and the folds formed at the predetermined areas progressively as the strip material is applied.

The infolding or tucking-in of the opposite edges of the strip material is effected in any suitable manner.

The steps in the method of applying the strip material to the toroidal object, such as the pre-weakening of the areas of the fold lines, the application of the strip material about the tread, or outer periphery of the toroidal object, then about side walls thereof, and the tucking-in and final locating of the infolded portions of the strip material may be carried out manually or by means of suitable apparatus.

Objects other than tires and tire casings and of a general toroidal formation, either solid or hollow, are enwrapped in a manner similar to that hereinabove described.

Various other methods of folding the strip 10 and 30 onto a tire casing will readily suggest themselves to those skilled in the art, and I am not to be limited merely to those illustrated and described.

I claim:

1. That improved method of encasing a toroidal object, such as a tire casing, in sheet wrapping material, which consists in advancing a sheet of the material, having adjacent to each longitudinal edge thereof areas defined by transversely extending pre-weakened lines, into engagement with the outer circumference of the tire casing, and folding the wrapping material at the pre-weakened lines to conform the areas defined by the pre-weakened lines to the outer side walls of the object, and then to the inner circumference.

2. That improved method of encasing a toroidal object, such as a tire casing, in sheet wrapping material which consists in advancing a sheet of the material, having adjacent to each longitudinal edge thereof areas defined by transversely extending pre-weakened lines, into engagement with the outer circumference, of the tire casing, folding the wrapping material at the pre-weakened lines to conform the areas defined by the pre-weakened lines to the outer side walls and inner circumference of the tire casing, and into engagement with the inner surface of the side walls.

3. That improved method of covering a tire casing which comprises advancing a sheet of covering material relative to the tire casing, weakening the sheet at the marginal zones along predetermined lines to define areas, folding the sheet at such predetermined lines to conform the defined areas about the side-walls and inner circumference of the tire casing, and tucking-in the opposing edge portions of the wrapping material about the tire beads and within the interior of the toroidal object.

4. That improved method of covering a tire casing, which comprises advancing into engagement with the outer circumference of the tire casing a sheet of fibrous wrapping material having its surface divided into a plurality of areas by pre-weakened lines, folding the sheet of wrapping material on the pre-weakened lines to conform the sheet to the outer surface of the tire casing, folding the edges of the sheet of wrapping material into the interior of the tire casing and around the beads thereof and then expanding the edges of the sheet of wrapping material to substantially their original length and into engagement with the interior surface of the side walls of the tire casing.

5. In the method of covering a tire casing, the steps comprising advancing into engagement with the outer circumference of the tire casing a sheet of paper having pre-weakened lines defining the sheet of paper into areas, and folding the sheet of paper on the pre-weakened lines to cause the defined areas to fold about the side walls and inner circumference of the tire casing and into the space between the tire beads.

6. That improved method of encasing a tire casing, in an envelope of sheet wrapping material, which comprises the steps of forming an endless band of the wrapping material, dividing said band into a medial zone, and a plurality of zones arranged parallel thereto and on either side thereof, placing the band on the tire casing with the medial zone in engagement with the tread on the outer circumference of the tire casing, maintaining the band on the tire casing in the position indicated, folding and plaiting the material of the zones adjacent the medial zone to conform the material of said zones to the side walls of the tire casing, folding and plaiting the material of the next adjacent zones to conform the material thereof to the inner circumference and around the bead into the interior of the tire casings.

7. That improved method of encasing a tire casing, in an envelope of sheet wrapping material, which comprises the steps of forming an endless band of the wrapping material, dividing said band into a medial zone, and a plurality of zones arranged parallel thereto and on either side thereof, placing the band on the tire casing with the medial zone in engagement with the tread on the outer circumference of the tire casing, maintaining the band on the tire casing in the position indicated, folding and plaiting the material of the zones adjacent the medial zone to conform the material of said zones to the side walls of the tire casing, and then expanding the edge of the outermost zones to lock the wrapping material in position on the tire casing.

8. That improved method of encasing a hollow toroidal object, such as a tire casing, in a sheet of wrapping material which comprises the steps of progressively applying the sheet directly to a circumferential surface of the object and causing the material to conform to the shape of the object by progressively folding the lateral portions of the sheet radially along the outer side walls of the object, causing the edges of the sheet to conform to and cover at least portions of the other circumferential surface of the object, and securing the sheet in place on the object.

9. That improved method of encasing a hollow toroidal object, such as a tire casing, in a sheet of wrapping material which comprises the steps of extending the sheet around the outer circumference of the object, folding the lateral portions of the sheet which cover the outer side walls of the object along lines which converge toward the center of said outer circumference, conforming such portions of the sheet to the shape of the outer side walls, extending the margins of the sheet into the interior of the object and unfolding such margins along the inner side walls of the object along lines which converge toward the center of said outer circumference as the margins are extended into the object.

WILLIAM A. RINGLER.